US012466686B2

(12) United States Patent
Crowley et al.

(10) Patent No.: US 12,466,686 B2
(45) Date of Patent: Nov. 11, 2025

(54) DISPENSING SYSTEM AND A DISPENSER

(71) Applicant: Wrapex Limited, Bristol (GB)

(72) Inventors: Jonathan Crowley, Bristol (GB); Gary Badham, Bristol (GB)

(73) Assignee: Wrapex Limited, Bristol (GB)

( * ) Notice: Subject to any disclaimer, the term of this patent is extended or adjusted under 35 U.S.C. 154(b) by 215 days.

(21) Appl. No.: 17/931,431

(22) Filed: Sep. 12, 2022

(65) Prior Publication Data

US 2023/0100565 A1 Mar. 30, 2023

(30) Foreign Application Priority Data

Sep. 24, 2021 (GB) ...................................... 2113657

(51) Int. Cl.
*B65H 75/30* (2006.01)
*B65H 23/08* (2006.01)
(Continued)

(52) U.S. Cl.
CPC ........... *B65H 35/002* (2013.01); *B65H 23/08* (2013.01); *B65H 75/30* (2013.01); *G01M 99/008* (2013.01);
(Continued)

(58) Field of Classification Search
CPC ........ A47K 10/16; A47K 10/34; A47K 10/38; A47K 10/3656; A47K 10/3662;
(Continued)

(56) References Cited

U.S. PATENT DOCUMENTS

| | | | | |
|---|---|---|---|---|
| 2,546,820 A * | 3/1951 | Grant | A47K 10/40 | 242/599.3 |
| 2,905,405 A * | 9/1959 | Burton | A47K 10/22 | 242/596.8 |

(Continued)

FOREIGN PATENT DOCUMENTS

| | | |
|---|---|---|
| DE | 4026895 A1 | 2/1992 |
| GB | 2558707 A | 7/2018 |

OTHER PUBLICATIONS

EP Search Report from corresponding EP Application No. 22190559 mailed Feb. 17, 2023.

*Primary Examiner* — Anna M Momper
*Assistant Examiner* — Henrix Soto
(74) *Attorney, Agent, or Firm* — Vorys, Sater, Seymour and Pease LLP

(57) ABSTRACT

A dispensing system includes a roll comprising a keyed end, a dispenser comprising a housing for receiving the roll, and a mount comprising a roll holder to support the keyed end and a roll support to support an opposing end. The roll holder comprises a frame, a clutch plate, a spindle, and a biasing unit, the clutch plate being disposed adjacent the spindle, and the spindle receives the keyed end and is rotatably coupled to the frame to permit rotation of the roll and the clutch plate about the dispensing axis. The spindle comprises a clutch surface and translates along the dispensing axis, and the biasing unit biases the spindle along the dispensing axis away from the frame. Mounting the keyed end of the roll onto the mount pushes the spindle towards the frame to increase a normal force between the clutch plate and the clutch surface.

14 Claims, 5 Drawing Sheets

(51) Int. Cl.
*B65H 35/00* (2006.01)
*G01M 99/00* (2011.01)

(52) U.S. Cl.
CPC .... *B65H 2402/54* (2013.01); *B65H 2403/725* (2013.01); *B65H 2701/17* (2013.01)

(58) Field of Classification Search
CPC ........ A47K 10/3845; A47K 2010/3863; B65H 23/08; B65H 2402/60; B65H 2403/725; B65H 2403/70; B65H 2403/732; B65H 75/30; B65H 75/185; B65H 16/005; B65H 16/06
USPC .......................................................... 242/565
See application file for complete search history.

(56) References Cited

U.S. PATENT DOCUMENTS 3,018,977 A * 1/1962 Skallquist ............ B65H 75/246 279/2.24
4,002,238 A * 1/1977 Cameron ............. G11B 23/107 206/416
4,121,783 A * 10/1978 Wolfinger .............. B65H 75/08 242/596.7
4,295,921 A 10/1981 Bopst, III
5,135,179 A * 8/1992 Morano ............. A47K 10/3836 242/565
5,938,142 A * 8/1999 Halperin ................ A47K 10/38 242/598.5
5,988,561 A * 11/1999 Mele ....................... A47K 10/40 242/599.3
6,581,500 B1 * 6/2003 Kietaibl ............. A47K 10/3656 225/5
6,948,673 B1 * 9/2005 Sato ....................... B65H 18/28 242/160.4
7,364,112 B1 * 4/2008 Formon ............. A47K 10/3836 242/564.1
11,072,513 B2 * 7/2021 Sulik ...................... B65H 16/04
2001/0054667 A1 * 12/2001 Komatsu ................ B65H 75/08 242/596.7
2004/0200922 A1 * 10/2004 Nakamura ............. B65H 16/06 242/559.2
2019/0084789 A1 * 3/2019 Worthington ........ B65H 75/185

* cited by examiner

DISPENSING SYSTEM AND A DISPENSER

FIELD OF THE INVENTION

The invention relates to a dispensing system, a dispenser and a method of testing for compliance.

BACKGROUND

Dispensing systems, such as food foil and film dispensers, typically receive a roll of material such as a foil or a film, and allow the roll to rotate freely about an axis to enable dispensing of the material. However, in some environments such as commercial kitchens, foil is pulled out of the dispenser quickly and can overrun and stick to itself, thereby wasting foil and sometimes jamming the roll, causing the dispenser to malfunction and not perform. Further, in such environments, it is important to ensure that the material used is food safe, and complies to the relevant food standards.

SUMMARY OF THE DISCLOSURE

According to an aspect, there is provided a dispensing system comprising: a roll comprising a keyed end; and a dispenser, the dispenser comprising a housing for receiving the roll, and a mount comprising a roll holder configured to support the keyed end of the roll and a roll support configured to support an opposing end of the roll; wherein the roll holder comprises a frame, a clutch plate, a spindle, and a biasing unit, the clutch plate being disposed adjacent the spindle, and the spindle being configured to receive the keyed end of the roll and being rotatably coupled to the frame to permit rotation of the roll with respect to the frame and the clutch plate about the dispensing axis; wherein the spindle comprises a clutch surface which directly opposes the clutch plate along the dispensing axis, and which is configured to cooperate with the clutch plate to resist relative rotation of the spindle and the clutch plate by friction; wherein the spindle is translatable along the dispensing axis with respect to the frame, and wherein the biasing unit is configured to bias the spindle in a direction along the dispensing axis away from the frame; wherein mounting of the keyed end of the roll onto the mount pushes the spindle towards the frame to increase a normal force between the clutch plate and the clutch surface of the spindle, thereby increasing the friction force.

The frame may comprise teeth which are configured to cooperate with teeth on the spindle facing the frame if a roll is mounted incorrectly to push the spindle towards the frame by more than a threshold distance, such that the teeth of the frame engage with the teeth on the spindle to lock rotation of the spindle relative to the frame.

The mount may comprise an arm which is pivotably mounted to the housing of the dispenser such that it can be pivoted out of the housing to improve access to the mount for mounting a roll. The mount may comprise a pair of arms on opposing sides of the housing, one arm coupled to the roll holder and one arm coupled to the roll support, and each arm may be connected to a wall of the housing so that each arm is configured to pivot out of the housing in unison.

The biasing unit may be a linear compression spring mounted between the frame and the spindle. The biasing unit may be disposed between the frame and the clutch plate to further bias the clutch plate away from the frame.

The clutch plate may comprise a central column and the frame may comprise a central hole configured to receive the central column, wherein the central column is configured to protrude from the central hole if the spindle is pushed towards the frame by more than a threshold distance, to limit pivoting movement of the mount back into the housing. The central column of the clutch plate may comprise a non-circular cross-section and the central hole of the frame may comprise a corresponding non-circular cross-section, to prevent rotation of the clutch plate relative to the frame.

The spindle may be pushed towards the frame by more than a threshold distance if the roll is mounted incorrectly or if a non-compliant roll is mounting to the mounting.

The spindle may comprise a circumferential surface configured to support the keyed end of the roll, and at least one lug may protrudes from the circumferential surface, and may key with a corresponding slot in the roll, forming the keyed end of the roll.

According to a second aspect, there is provided a dispenser comprising a housing for receiving a roll, the housing having a mount comprising a roll holder configured to support a keyed end of the roll and a roll support configured to support an opposing end of a roll; wherein the roll holder comprises a frame, a clutch plate, a spindle, and a biasing unit, the clutch plate being disposed adjacent the spindle, and the spindle being configured to receive the keyed end of the roll and being rotatably coupled to the frame to permit rotation of the roll with respect to the frame and the clutch plate about the dispensing axis; wherein the spindle comprises a clutch surface which directly opposes the clutch plate along the dispensing axis, and which is configured to cooperate with the clutch plate to resist relative rotation of the spindle and the clutch plate by friction; wherein the spindle is translatable along the dispensing axis with respect to the frame, and wherein the biasing unit is configured to bias the spindle in a direction along the dispensing axis away from the frame, such that mounting a roll onto the mount pushes the spindle towards the frame to increase a normal force between the clutch plate and the clutch surface of the spindle, thereby increasing the friction force.

The frame may comprise teeth which are configured to cooperate with teeth on the spindle facing the frame such that if the spindle is pushed towards the frame by more than a threshold distance, the teeth of the frame engage with the teeth on the spindle to lock rotation of the spindle relative to the frame.

The mount may comprise an arm which is pivotably mounted in the housing of the dispenser such that it can be pivoted out of the housing to improve access to the mount for mounting a roll. The mount may comprise a pair of arms on opposing sides of the housing, one arm coupled to the roll holder and one arm coupled to the roll support, and each arm may be connected to a wall of the housing so that each arm is configured to pivot out of the housing in unison.

The biasing unit may be a linear compression spring mounted between the frame and the spindle. The biasing unit may be disposed between the frame and the clutch plate to further bias the clutch plate away from the frame.

The clutch plate may comprise a central column and the frame may comprise a central hole configured to receive the central column, wherein the central column may be configured to protrude from the central hole the spindle is pushed towards the frame by more than a threshold distance, to limit pivoting movement of the mount back into the housing. The central column of the clutch plate may comprise a non-circular cross-section and the central hole of the frame may comprise a corresponding non-circular cross-section, to prevent rotation of the clutch plate relative to the frame.

The spindle may comprise a circumferential surface configured to support the keyed end of the roll, and at least one lug may protrude from the circumferential surface, and may key with a corresponding slot in the roll, forming the keyed end of the roll.

According to a third aspect, there is provided a method comprising receiving a dispensing system in accordance with the first aspect and mounting the keyed end of the roll onto the mount to push the spindle of the mount towards the frame to increase a normal force between the clutch plate and the clutch surface of the spindle, thereby increasing the friction force.

According to a fourth aspect, there is provided a method of testing for compliance, the method comprising receiving a dispenser in accordance with the second aspect, and receiving a plurality of rolls, the method further comprising: mounting one roll of the plurality of rolls onto the mount of the dispenser, to push the spindle of the mount towards the frame to increase a normal force between the clutch plate and the clutch surface of the spindle, thereby increasing the friction force; and testing whether the plurality of rolls are compliant by: applying a predetermined force to turn the roll mounted on the dispenser, measuring a rotation amount of the roll relative to the frame, and comparing the rotation amount to a threshold rotation; and determining whether the plurality of rolls are compliant based on the comparison.

BRIEF DESCRIPTION OF THE DRAWINGS

Embodiments of the invention will now be described, by way of example, with reference to the accompanying drawings, in which.

DETAILED DESCRIPTION

Figure 1:
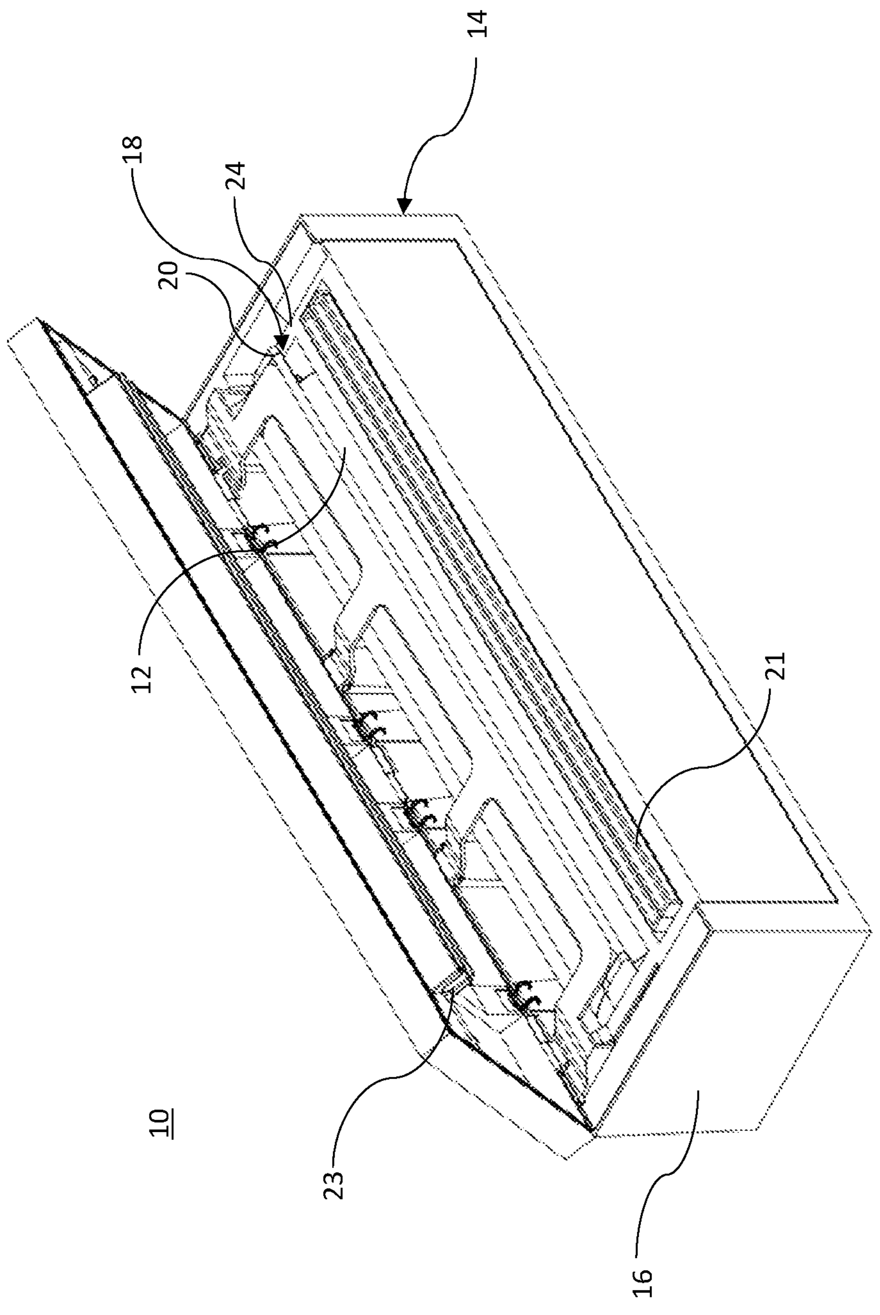
FIG. 1 schematically shows an isometric view of a dispensing system in a loaded configuration.
Figure 2:
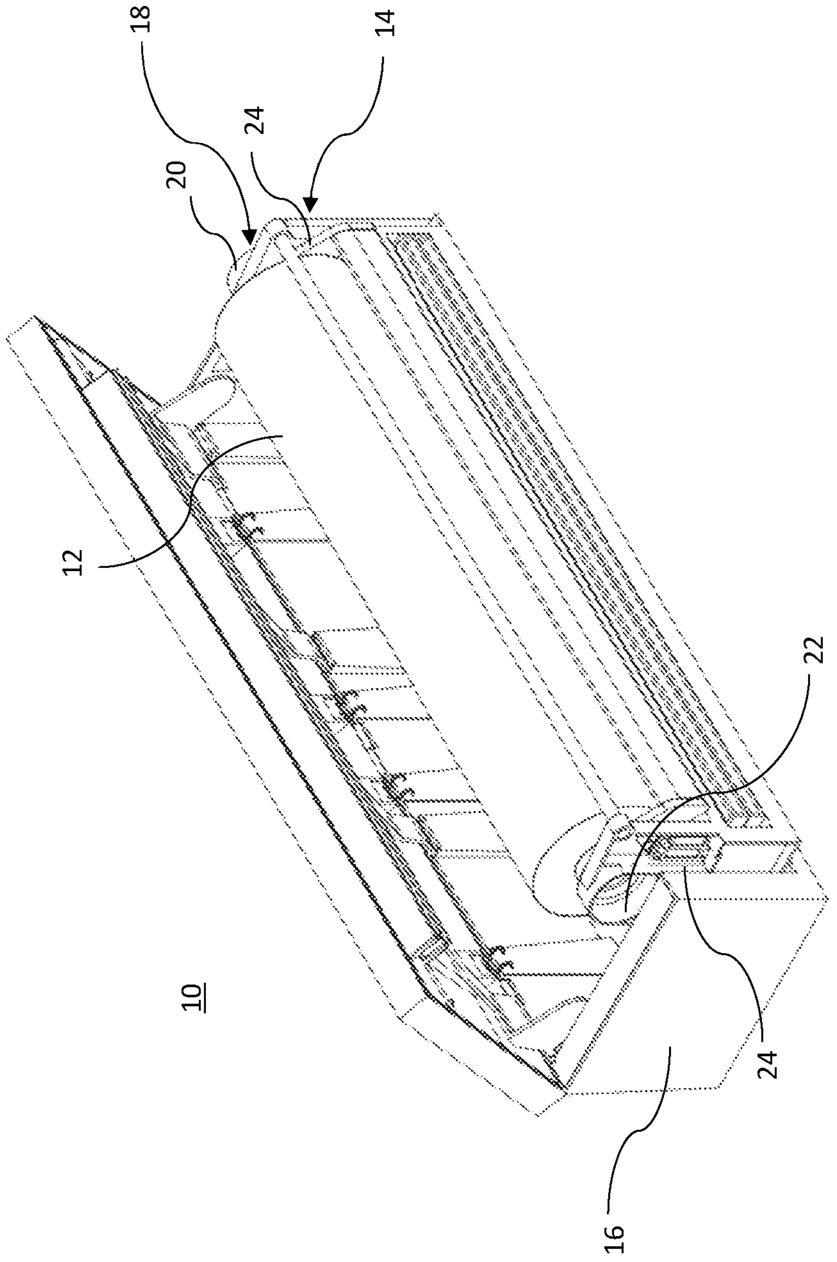
FIG. 2 schematically shows the dispensing system of FIG. 1 in an unloaded configuration.

FIGS. 1 and 2 show a dispensing system 10 in a loaded configuration and an unloaded configuration respectively.

The dispensing system 10 comprises a roll 12 and a dispenser 14. The dispenser 14 comprises a housing 16 for receiving the roll 12. The housing 16 comprises a base, two side walls, a front wall, a back wall, and a lid, such that the housing defines an interior space which is surrounded by the walls, the base and the lid, which interior space is configured to receive a roll of consumable material, such as a roll of aluminium foil or a roll of clingfilm. The lid is pivotably attached to the back wall and can be pivoted open to provide access to the interior space. The front wall of the dispenser comprises a blade 21 which is configured to interact with a counteracting channel 23 in the lid so that when foil or film is extending from the roll 12 out of the dispenser 14, and the lid is pressed down onto the front wall, the blade 21 cuts the foil or film.

A mount 18 comprises a roll holder 20 and a roll support 22 to support opposing ends of the roll 12. The mount 18 comprises a pair of arms 24 which are pivotably mounted to the housing 16, such that the mount 18 can be pivoted from the loaded position, as shown in FIG. 1, out of the housing 16 to the unloaded position, as shown in FIG. 2, to improve access to the mount 18 for mounting a roll 12. The roll holder 20 and the roll support 22 are each fixed to a respective arm 24 on a distal end of the arm 24, and each arm 24 is pivotably connected to a respective side wall at a point on the arm 24 away from the roll holder 20 and the roll support 22, so that the pivoting movement of each arm 24 pivots the respective roll holder 20 or roll support 22 out of the interior space of the housing 16, through the access provided by the open lid.

In this example, each arm 24 is also fixed at a proximal end to the front wall of the housing 16, which wall of the housing is detached from the remaining walls of the housing 16, such that it can pivot with the mount 18 relative to the other walls of the housing 16. The point at which the arms 24 pivotably connected to the respective side walls is between the distal end and the proximal end of each arm 24. Fixing both arms 24 to a single wall means that both arms can move in unison out of the housing 16. Fixing both arms 24 to the front wall of the housing 16 means that the interior space does not have to be made larger to accommodate another wall connecting the two arms. This means that the dispenser 14 can be made smaller than if the arms are connected to a separate elongate wall within the interior space.

It will be appreciated that the arms may not be fixed to a front wall of the housing, and may only be pivotably connected to a side wall of the housing. In some examples, the mount may have only a single arm pivotably connected to the housing to which the roll holder and/or roll support may be fixed.

Figure 3B:
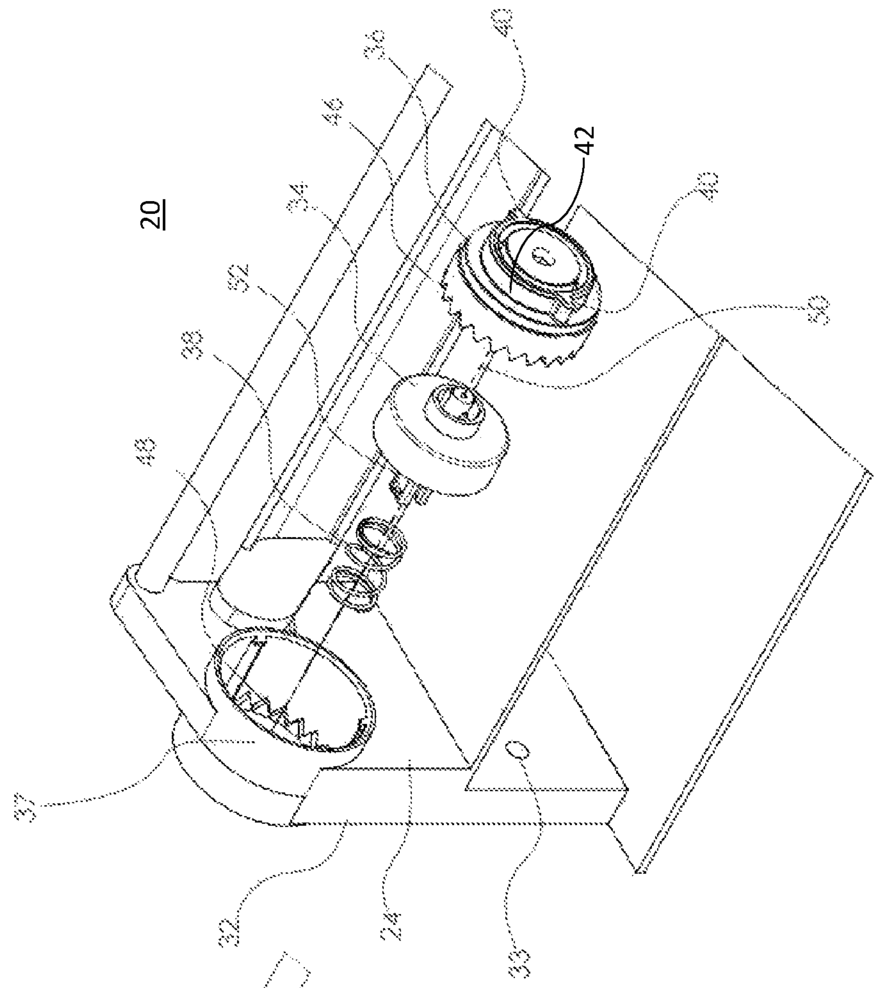
FIGS. 3A and 3B respectively show a front isometric view and a front exploded view of a mount of the dispensing system of FIG. 1.
Figure 3A:
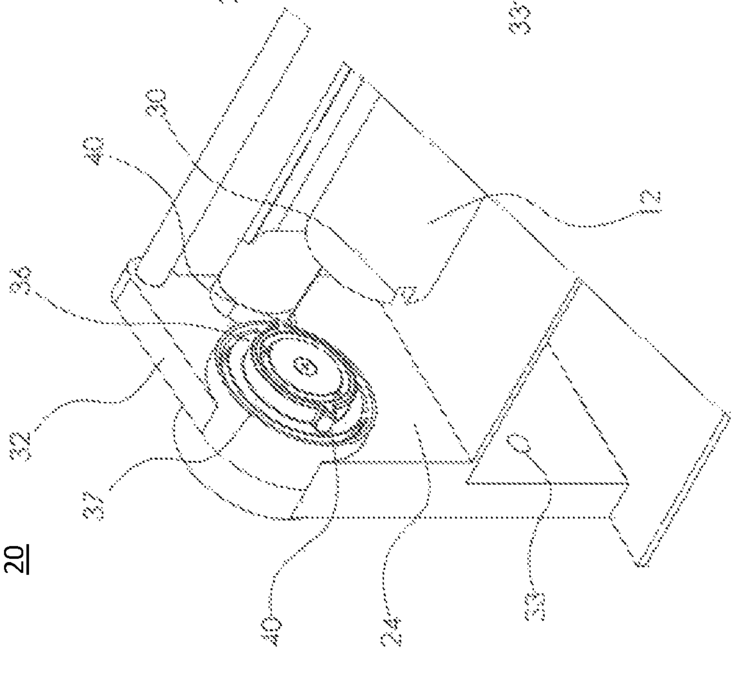
Figure 4B:
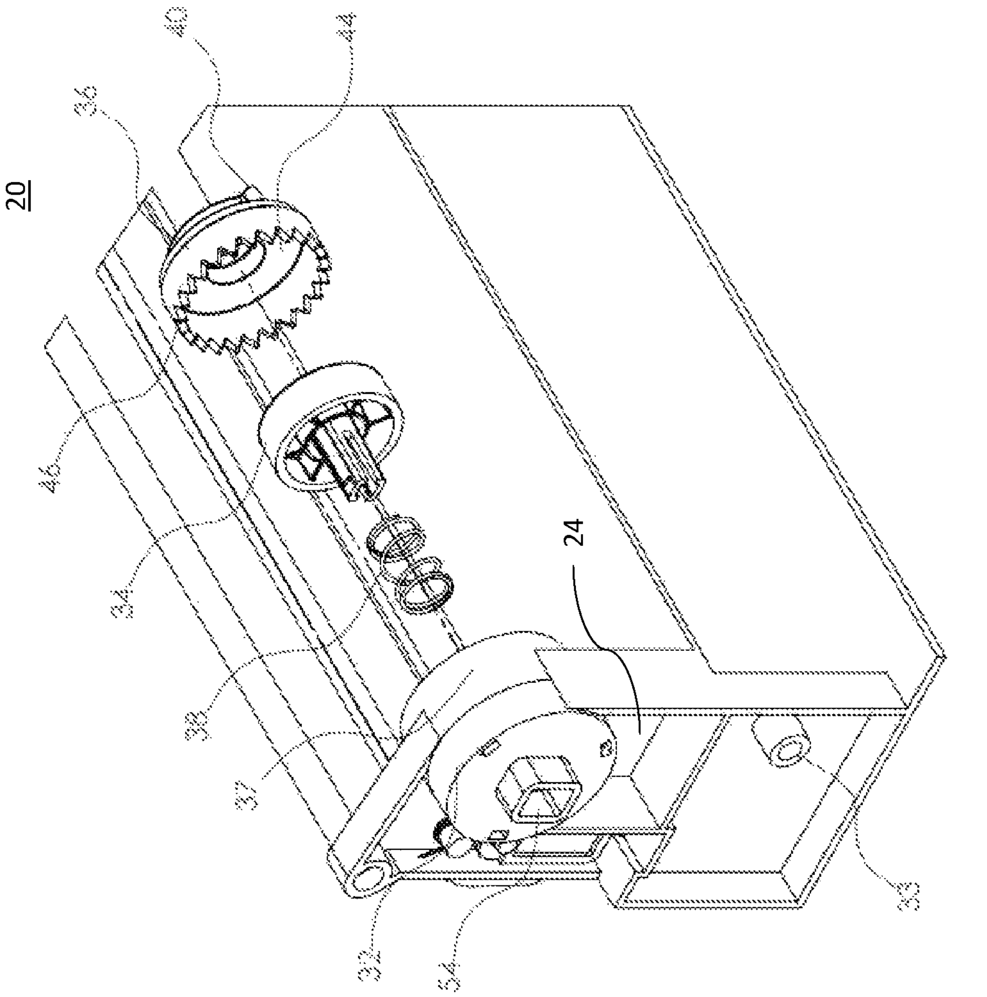
FIGS. 4A and 4B respectively show a back isometric view of the mount of FIG. 3A 3B, and a back exploded view of the mount.
Figure 4A:
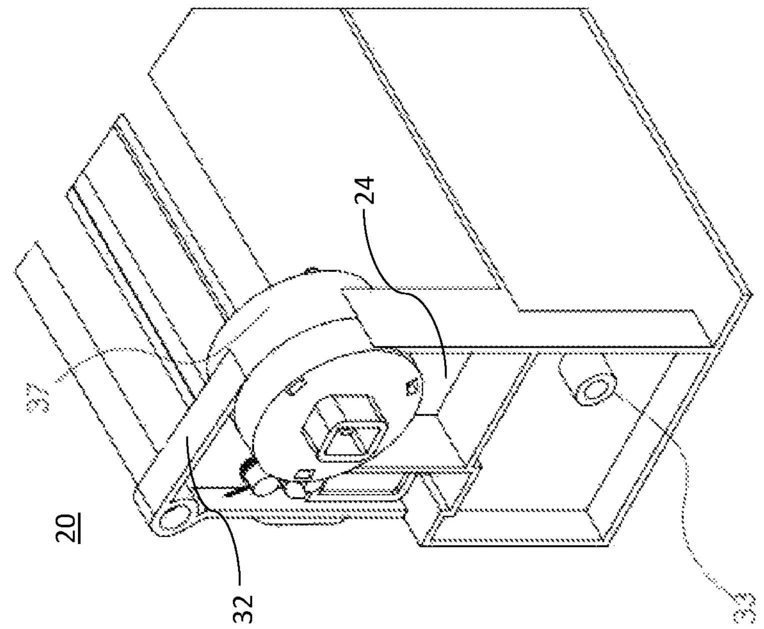

FIGS. 3A and 4A show respectively front and back isometric views of the roll holder 20, and FIGS. 3B and 4B show respectively front and back exploded views of the roll holder 20. FIG. 3A also shows a keyed end 30 of the roll 12 which is configured to be mounted on, and supported by, the roll holder 20. The keyed end 30 of the roll 12 in this example comprises a pair of opposing slots in the roll, which are configured to interface with the roll holder 20 to ensure that the roll 12 being mounted is compliant. In other examples, the keyed end of the roll may have any suitable feature which is specifically configured to mate with the roll holder of the dispenser. An opposing end of the roll 12 in this example does not have a keyed end, such that the keyed end 30 of the roll 12 also ensures correct orientation of the roll 12 for dispensing. In some examples, the opposing end of the roll may have a different keyed end which also helps to ensure correct orientation of the roll. In other examples, the opposing end of the roll may have the same keyed profile as the keyed end of the roll.

The roll holder 20 comprises a frame 32, a clutch plate 34, a spindle 36, and a biasing unit 38. In this example, the frame 32 defines the arm 24 of the mount 18 at a back end of the frame 32, and a cylindrical section 37 extending from the back end towards a front end of the frame 32. In other examples, it will be appreciated that the frame may be fixed to a separate arm which is configured to pivot with respect to the side wall of the housing. The clutch plate 34 and the spindle 36 is disposed within the cylindrical section 37. In other examples, the frame may not comprise the cylindrical section, and may comprise on the back end of the frame. There may be, for example, a central axle extending from the frame, which supports the spindle and the clutch plate.

The frame 32 also comprises a pivoting mechanism 33 at which the arm 24 of the frame 32 is mounted to the side wall of the housing 16 such that it can pivot with respect to the side wall.

The spindle 36 comprises a circumferential surface 42 which is configured to support the roll 12, and to receive the keyed end 30 of the roll 12, with a pair of lugs 40 which protrude from opposing sides of the circumferential surface 42 and which key with the slots of the keyed end 30 of the roll 12. In other examples, the spindle may define any suitable shape to receive the keyed end of the roll.

The spindle 36 is rotatably coupled to the frame 32 to permit rotation of the spindle 36 relative to the frame 32 and relative to the clutch plate 34, about a dispensing axis 50. When the roll 12 is mounted to the spindle 36, the roll 12 is therefore also rotatable relative to the frame 32 and the clutch plate 34 about the dispensing axis 50, to enable dispensing of material from the roll 12.

The spindle 36 also comprises a clutch surface 44 (best seen in FIG. 4B), on an opposing face of the spindle to the circumferential surface 42 and the lugs 40, which clutch surface 44 directly opposes the clutch plate 34 along the dispensing axis 50. The clutch surface 44 and the clutch plate 34 are configured to cooperate to resist relative rotation of the spindle 36 and the clutch plate 34 by friction.

The clutch plate 34 is coupled to the frame 32 and in this example, the clutch plate 34 is disposed between the spindle 36 and the back end of frame 32. In this example, both the clutch plate 34 and the spindle 36 are translatable along the dispensing axis 50 with respect to the frame 32 within the cylindrical section 37 of the frame 32.

The biasing unit 38 is disposed between the clutch plate 34 and the frame 32 along the dispensing axis 50, which biases the clutch plate 34, and therefore also the spindle 36, away from the back end of the frame 32. In this example, the biasing unit 38 is a linear compression spring. In other examples the biasing unit may be any suitable apparatus to bias the clutch plate and the spindle 36 away from the frame.

Since the spindle 36 and the clutch plate 34 are translatable along the dispensing axis 50 with a biasing unit 38 forcing them away from the frame 32, when the spindle 36 is pushed towards the frame 32, for example, by mounting of the keyed end 30 of the roll 12 onto the spindle 36, the biasing unit 38 is compressed such that it provides a larger biasing force to push the clutch plate 34 away from the frame 32. Therefore, the normal force acting between the spindle 36 and the clutch plate 34 is increased, to thereby increase the friction force resisting rotation between the spindle 36 and the clutch plate 34, to provide a braking action to relative rotation of the spindle 36 and the clutch plate 34.

In this example, the roll support 22 comprises a cylindrical surface which is configured to be received in an end of the roll 12 opposing the keyed end 30, to support the roll 12. As such, mounting of the roll 12 onto the mount 18 (such as by mounting the keyed end 30 onto the roll holder 20 followed by the opposing end onto the roll support 22) moves the spindle 36 towards the frame 32, and thereby increases the friction force between the spindle 36 and the clutch plate 34 to provide a braking force to rotation of the spindle 36 relative to the frame 32.

The braking force ensures that, when material on the roll 12 is pulled to be dispensed, the overrun of the roll is reduced, so that less material is wasted. Further, the braking force also increases the tension on the material as it is being pulled from the roll 12, such that the blade 21 and the channel 23 are more effective at cutting the material. Furthermore, having the spindle 36 relatively freely rotatable before the roll 12 is mounted to the mount 18 also makes mounting of the keyed end 30 of the roll 12 onto the spindle 36 easier for a user, while actuating or increasing a braking force only when the roll 12 is mounted.

The biasing unit 38 in the mount 18 also increases the tolerance for the length of the roll 12 (i.e. increases the range of lengths of roll 12 which can be mounted) because the circumferential surface 42 of the roll holder 20 is always pushed towards the keyed end 30 of the roll 12. This is particularly useful considering that the roll 12 often comprises a living material such as a cardboard core which can change size depending on local moisture conditions. The biasing unit 38 therefore ensures that the mount 18 able to accommodate the changes in length of the roll due to local moisture conditions, whilst still supporting the roll 12 and actuating the brake. Accordingly, the biasing unit 38 simultaneously performs two functions of increasing a braking force when a roll is mounted and increasing the tolerance for the length of the roll.

The spindle 36 further comprises a set of teeth 46 facing the back end of the frame 32, and the frame 32 comprises a corresponding set of teeth 48 at the back end which are configured to cooperate with the teeth 46 on the spindle 36 if the spindle 36 is pushed towards back end of the frame 32 by more than a first threshold distance along the dispensing axis 50. In this example, the first threshold distance is 7.4 mm, beyond which the teeth 46 of the spindle 36 and the teeth 48 of the frame 32 start to engage to prevent rotation of the spindle 36 relative to the frame 32.

This ensures that, if a roll 12 is mounted incorrectly, or if a non-compliant roll which is too long for the dispenser 14 is mounted in the dispenser, rotation of the spindle 36 relative to the frame 32 will lock when the respective sets of teeth 46, 48 engage, such that it cannot be used.

The clutch plate 34 also comprises a central column 52 extending along the dispensing axis 50 towards the back end of the frame 32. The frame 32 comprises a corresponding central hole 54 configured to receive the central column 52, such that if the spindle 36, and therefore the clutch plate 34 is pushed towards the back end of the frame 32 by more than the first threshold distance along the dispensing axis 50, for example when a roll 12 is incorrectly mounted, the central column 52 protrudes from the central hole 54 such that the central column 52 limits pivoting movement of the arm 24 back into the housing 16, since the central column 52 abuts the side wall of the housing 16, to prevent the roll holder 20, and therefore the mount 18 from being fully received in the housing 16. In this example, the central column 52 begins to protrude from the central hole 54 in the frame 32 at a second threshold distance of 5.4 mm, since there is a small amount of clearance between the frame 32 and the side wall, such that, at the first threshold distance of 7.4 mm, the central column 52 interacts with the side wall to prevent pivoting movement of the arm 24 back into the housing 16. It will be appreciated that the first threshold distance and the second threshold distance may be any suitable distance.

The central column 52 also comprises a truncated circular cross-section and the central hole 54 comprises a similar truncated circular cross-section such that the central column 52 received within the central hole 54 also performs a function to prevent rotation of the clutch plate 34 relative to the frame 32 about the dispensing axis 50. In other examples, the central column and the central hole comprise any cooperating non-circular cross-section which prevents rotation of the clutch plate relative to the frame. In other examples, there may be any suitable mechanism which prevents rotation of the clutch plate relative to the frame, such as ribs on a circumferential edge of the clutch plate which cooperate with recesses in the frame.

Therefore, the dispenser has a brake system, and the interaction of a roll with the brake system is required to actuate it or increase its friction. The roll must therefore be specifically sized and keyed to fit with the dispenser.

Although it has been described that the biasing unit 38 is disposed between the clutch plate 34 and the frame 32, and that the clutch plate 34 is disposed between the spindle 36 and the frame 32, in other examples, the biasing unit may be disposed between the clutch plate and the spindle and/or the clutch plate may be fixed to, or unitary with, the frame. The clutch plate and the spindle must merely be adjacent so that the opposing clutch surfaces can resist rotation by friction.

Figure 5:
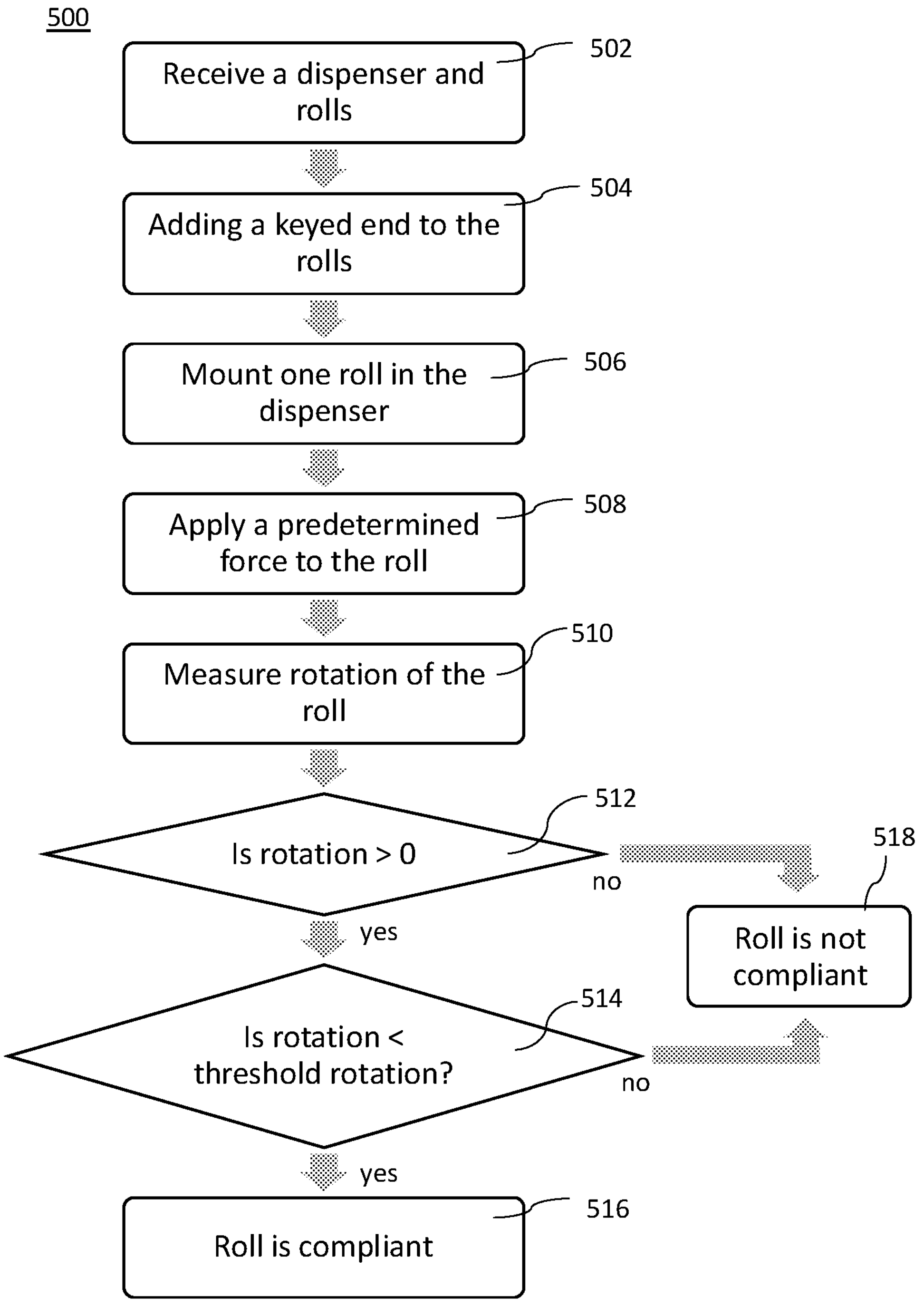
FIG. 5 is a flow chart showing steps of a method of testing.

FIG. 5 is a flow chart showing steps of a method 500 of testing compliance of a plurality of rolls 12. In block 502, the method 500 comprises receiving a dispenser 14, such as the dispenser described above with reference to FIGS. 1-4, or a test dispenser. It also comprises receiving a plurality of rolls 12. The rolls 12 in this example may comprise foil or film, or may be empty, and configured to receive a foil or film. In this example, the method may comprise receiving 100 rolls. In other example, the method may comprise receiving any suitable number of rolls such as 50, 200, 500, 1000, for example.

In block 504, the method 500 comprises adding a keyed end 30 to the plurality of rolls 12 which is compatible with the mount 18 of the dispenser 14. In other examples, the rolls 12 may be received with a keyed end 30 already.

In block 506, the method 500 comprises mounting one of the plurality of rolls 12 onto the mount 18 of the dispenser 14. Mounting of the keyed end 30 of the roll 12 onto the mount 18 pushes the spindle 36 of the mount 18 towards the frame 32 to increase a normal force between the clutch plate 34 and the clutch surface 44 of the spindle 36, thereby increasing the friction force between the spindle 36 and the clutch plate 34. This single roll 12 may be used to test the compliance of a batch of rolls 12, such as the plurality of rolls 12 received.

In block 508, the method 500 comprises applying a predetermined force to the roll 12 12 to thereby turn the roll 12 with respect to the frame 32. In this example, this is done by applying a force to a foil or film wound around the roll 12. The force may be applied to the film around the roll 12, to pull the film for a predetermined distance, for example. In other examples, this may be done by applying a force directly to the roll 12.

In block 510, the method 500 comprises measuring the total rotation of the roll 12 with respect to the frame 32. If the roll 12 is correctly dimensioned with the keyed end 30 correctly made, then the friction force between the clutch plate 34 and the spindle 36 should be sufficient to arrest rotation of the roll 12 when the force is no longer applied. If the roll 12 is not correctly dimensioned or the keyed end 30 is not correctly inserted or made, then the friction between the clutch plate 34 and the spindle 36 may not be sufficient to arrest the rotation of the roll 12 when the force is no longer applied, such that there is an overrun of rotation. In an example in which the force is applied directly to the roll, if the roll is not correctly dimensioned or the keyed end is not correctly inserted or made, then the friction between the clutch plate and the spindle may not resist the rotation of the roll, such that the roll will rotate unimpeded. If the roll is correctly dimensioned, then the rotation of the roll may be resisted by the increased friction between the spindle and the clutchplate, such that there is a smaller rotation of the roll with respect to the frame.

Further, if the roll 12 is too long, the teeth 46, 47 of the frame 32 and the spindle 36 will engage to prevent any rotation of the roll 12 relative to the frame 32.

In block 512, the method 500 comprises determining whether the roll 12 has rotated at all relative to the frame 32 (i.e., determining if the rotation of the roll 12 larger than zero degrees). If the roll has not rotated relative to the frame 32, the method 500 proceeds to block 518 in which it is determined that the roll is not compliant (i.e., the roll 12 must be too long such that the teeth 46, 48 and have engaged). If the roll 12 has rotated relative to the frame 32, the method 500 proceeds to block 514.

In block 514, the method 500 comprises comprising the rotation of the roll 12 relative to the frame 32 to a threshold rotation. In this example, it comprises determining whether the rotation of the roll 12 relative to the frame 32 is smaller than the threshold rotation. If the rotation of the roll 12 is smaller than the threshold rotation, then it can be determined that the friction between the clutch plate 34 and the spindle 36 has increased as expected, such that there is no overrun of the roll 12. Therefore, the method 500 proceeds to block 516 in which it is determined that the roll is compliant. If the rotation of the roll 12 is larger than the threshold rotation, then it can be assumed that the friction between the clutch plate 34 and the spindle 36 has not increased as expected, such that the method 500 proceeds to block 518.

Although it has been described that block 514 follows block 512, it will be appreciated that in other examples, blocks 512 and 514 can occur in either order, or at the same time. Further, it will be appreciated that in examples where there are no teeth 46, 48 on the frame and the spindle to engage, block 512 may be omitted from the method.

What is claimed is:

1. A dispenser comprising a housing for receiving a roll, and a mount comprising a roll holder configured to support a keyed end of the roll and a roll support configured to support an opposing end of the roll;

wherein the roll holder comprises a frame, a clutch plate, a spindle, and a biasing unit, the clutch plate being disposed adjacent the spindle, and the spindle being configured to receive the keyed end of the roll and being rotatably coupled to the frame to permit rotation of the roll with respect to the frame and the clutch plate about a dispensing axis;

wherein the spindle comprises a clutch surface which directly opposes the clutch plate along the dispensing axis, and which is configured to cooperate with the clutch plate to resist relative rotation of the spindle and the clutch plate by friction;

wherein the spindle is translatable along the dispensing axis with respect to the frame, and wherein the biasing unit is configured to bias the spindle in a direction along the dispensing axis away from the frame;

wherein mounting of the keyed end of the roll onto the mount pushes the spindle towards the frame to increase a normal force between the clutch plate and the clutch surface of the spindle, thereby increasing the friction force; and wherein the spindle is arranged to disengage from the clutch plate when a roll is not mounted to the mount.

2. The dispenser according to claim 1, wherein the mount comprises an arm which is pivotably mounted to the housing of the dispenser such that it can be pivoted out of the housing to improve access to the mount for mounting the roll.

3. The dispenser according to claim 2, wherein the mount comprises a pair of arms on opposing sides of the housing, one arm coupled to the roll holder and one arm coupled to the roll support, each arm connected to a wall of the housing so that each arm is configured to pivot out of the housing in unison.

4. The dispenser according to claim 1, wherein the biasing unit is a linear compression spring mounted between the frame and the spindle.

5. The dispenser according to claim 1, wherein the biasing unit is disposed between the frame and the clutch plate to further bias the clutch plate away from the frame.

6. The dispenser according to claim 1, wherein the spindle comprises a circumferential surface configured to support the keyed end of the roll, and at least one lug protrudes from the circumferential surface, and keys with a corresponding slot in the roll, forming the keyed end of the roll.

7. A dispensing system comprising:

a roll comprising a keyed end, and the dispenser according to claim 1 wherein mounting the roll onto the mount pushes the spindle towards the frame to increase a normal force between the clutch plate and the clutch surface of the spindle, thereby increasing the friction force.

8. A method comprising receiving a dispensing system according to claim 7 and mounting the keyed end of the roll onto the mount to push the spindle of the mount towards the frame to increase a normal force between the clutch plate and the clutch surface of the spindle, thereby increasing the friction force.

9. The dispensing system according to claim 7, wherein the spindle is arranged to disengage from the clutch plate to rotate substantially freely when the roll is not mounted to the mount.

10. A method of testing for compliance, the method comprising receiving the dispenser according to claim 1, and receiving a plurality of rolls, the method further comprising:

mounting one roll of the plurality of rolls onto the mount of the dispenser, to push the spindle of the mount towards the frame to increase a normal force between the clutch plate and the clutch surface of the spindle, thereby increasing the friction force; and testing whether the plurality of rolls are compliant by:

applying a predetermined force to turn the roll mounted on the dispenser, measuring a rotation amount of the roll relative to the frame, and comparing the rotation amount to a threshold rotation; and determining whether the plurality of rolls are compliant based on the comparison.

11. The dispenser according to claim 1, wherein mounting of the keyed end of the roll onto the mount moves the spindle and the clutch plate towards the frame.

12. A dispenser comprising a housing for receiving a roll, the housing having a mount comprising a roll holder configured to support a keyed end of the roll and a roll support configured to support an opposing end of a roll;

wherein the roll holder comprises a frame, a clutch plate, a spindle, and a biasing unit, the clutch plate being disposed adjacent the spindle, and the spindle being configured to receive the keyed end of the roll and being rotatably coupled to the frame to permit rotation of the roll with respect to the frame and the clutch plate about a dispensing axis;

wherein the spindle comprises a clutch surface which directly opposes the clutch plate along the dispensing axis, and which is configured to cooperate with the clutch plate to resist relative rotation of the spindle and the clutch plate by friction;

wherein the spindle is translatable along the dispensing axis with respect to the frame, and wherein the biasing unit is configured to bias the spindle in a direction along the dispensing axis away from the frame, such that mounting a roll onto the mount pushes the spindle towards the frame to increase a normal force between the clutch plate and the clutch surface of the spindle, thereby increasing the friction force; and wherein the frame comprises teeth which are configured to cooperate with teeth on the spindle facing the frame if a roll is mounted incorrectly to push the spindle towards the frame by more than a threshold distance, such that the teeth of the frame engage with the teeth on the spindle to lock rotation of the spindle relative to the frame.

13. A dispenser comprising a housing for receiving a roll, the housing having a mount comprising a roll holder configured to support a keyed end of the roll and a roll support configured to support an opposing end of a roll;

wherein the roll holder comprises a frame, a clutch plate, a spindle, and a biasing unit, the clutch plate being disposed adjacent the spindle, and the spindle being configured to receive the keyed end of the roll and being rotatably coupled to the frame to permit rotation of the roll with respect to the frame and the clutch plate about a dispensing axis;

wherein the spindle comprises a clutch surface which directly opposes the clutch plate along the dispensing axis, and which is configured to cooperate with the clutch plate to resist relative rotation of the spindle and the clutch plate by friction;

wherein the spindle is translatable along the dispensing axis with respect to the frame, and wherein the biasing unit is configured to bias the spindle in a direction along the dispensing axis away from the frame, such that mounting a roll onto the mount pushes the spindle towards the frame to increase a normal force between the clutch plate and the clutch surface of the spindle, thereby increasing the friction force;

wherein the biasing unit is disposed between the frame and the clutch plate to further bias the clutch plate away from the frame; and wherein the clutch plate comprises a central column and the frame comprises a central hole configured to receive the central column, wherein the central column is configured to protrude from the central hole if the spindle is pushed towards the frame by more than a threshold distance, to limit pivoting movement of the mount back into the housing.

14. The dispenser according to claim 13, wherein the central column of the clutch plate comprises a non-circular cross-section and the central hole of the frame comprises a corresponding non-circular cross-section, to prevent rotation of the clutch plate relative to the frame.

* * * * *